UNITED STATES PATENT OFFICE.

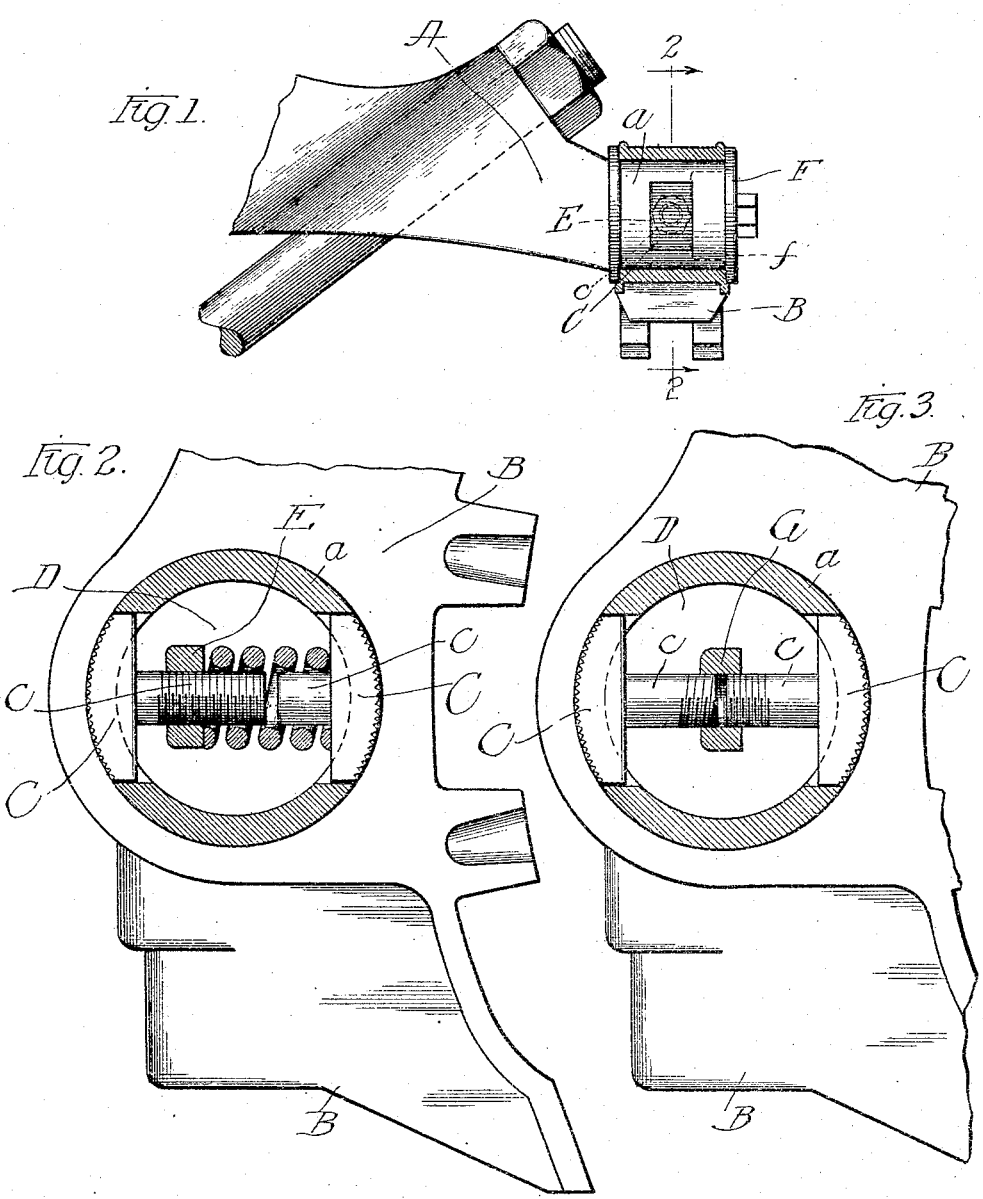

ANDREW R. PEFFERS, OF AURORA, ILLINOIS, ASSIGNOR, BY DIRECT AND MESNE ASSIGNMENTS, TO CHICAGO RAILWAY EQUIPMENT COMPANY, OF CHICAGO, ILLINOIS, A CORPORATION OF ILLINOIS.

BRAKE-HEAD TRUNNION.

1,205,385.  Specification of Letters Patent.  Patented Nov. 21, 1916.

Original application filed September 18, 1913, Serial No. 790,488. Divided and this application filed June 7, 1915. Serial No. 32,506.

*To all whom it may concern:*

Be it known that I, ANDREW R. PEFFERS, a citizen of the United States of America, and resident of 55 South Anderson street, Aurora, Illinois, where I am now living and receive mail, have invented a certain new and useful Improvement in Brake-Head Trunnions, of which the following is a specification.

My invention relates to brake beams of that kind in which the brake heads are swiveled or arranged to oscillate on trunnions formed at the ends of the beam.

My invention relates more particularly to the means for holding the brake heads frictionally in place on the said trunnions, thereby preventing said heads from turning around when the brake shoes are withdrawn from the wheels. In this way, the brake shoes are held approximately in position to engage the wheels as soon as the brake beam is drawn forward, but are not so fixedly held as to prevent their automatic self adjustment to the curvature of the wheels. In other words, the full benefit of the swivel or trunnion bearings is obtained, in the usual and well known manner, but at the same time the brake heads are held against loosely dropping down when the shoes leave the wheels and are retracted a distance therefrom.

Generally stated, the object of my invention is to provide a novel and efficient device for frictionally holding the brake shoe head against rotation on the swivel or trunnion at the end of the brake beam.

A special object is to provide a brake shoe head retaining device of this character which can be easily adjusted to take up wear, and which can be easily inserted and removed, thereby rendering the said device effective and certain in operation and satisfactory in use, as will hereinafter more fully appear.

It is also an object to provide certain details and features of construction tending to increase the general efficiency and desirability of a brake head retaining device of this particular character.

To these and other useful ends, my invention consists in matters hereinafter set forth and claimed.

In the accompanying drawings, Figure 1 is a plan of one end portion of a brake beam provided with a trunnion or cylindric end portion having a brake head retaining device for frictionally holding the brake head against rotation on the trunnion, said device embodying the principles of my invention, and the brake head being shown in section. Fig. 2 is an enlarged transverse section on line 2—2 in Fig. 1. Fig. 3 is a view similar to Fig. 2, showing a different form of my invention.

As thus illustrated, my invention comprises a brake beam A of any suitable known or approved construction, but preferably provided with a cylindric end portion $a$ which is in the nature of a trunnion or swivel upon which the brake head B is mounted to turn or oscillate in order that the shoe may automatically adjust itself or conform to the curvature of the wheel, thus preventing unequal or non-uniform wear on the shoe.

As shown in Figs. 1 and 2, the retaining device for frictionally holding the brake head against rotation on the trunnion $a$ is constructed as follows: Two oppositely disposed wearing pieces C are arranged within the recess D in the trunnion, this recess extending transversely of the said trunnion, and said wearing pieces being shaped to engage the cylindric inner surface of the brake head at opposite sides of said trunnion. These wearing pieces are provided with stems $c$ which are spaced a distance apart, one of said stems being threaded and provided with a nut E, a spring $e$ being interposed between this nut and the other wearing piece. In this way, the spring $e$ yieldingly holds the two wearing pieces in engagement with the brake head, causing the latter to remain in any position in which it is placed on the trunnion, but not fixedly enough to prevent the brake head and shoe from readily adjusting themselves to the curve of the wheel when the brakes are applied. By adjusting the nut E the tension of the said spring can be regulated to suit the requirements and to take up wear. A retaining element F is provided with a reduced screw threaded portion $f$, which is screwed into the threaded socket formed in the end of the trunnion, the rim portion of this element bearing against the brake head to hold the latter against displacement.

As shown in Fig. 3 the construction is substantially the same as shown in Fig. 2, except that in this case both stems *c* are threaded and connected by a nut G which can be adjusted to crowd the two wearing pieces C away from each other and against the brake head. When the wearing pieces C become worn, and when the brake head again becomes loose on the trunnion, the nut G can then be adjusted to increase the friction and thereby keep the brake head from turning around when the brakes are away from the wheels. In either case, however, the adjustment can be readily effected by simply removing the cap or retaining element F from the end of the trunnion, and then by reaching in and turning the nut E or G, depending upon the construction employed, whereby it is not necessary to remove the brake head in order to properly adjust the friction retaining device. When the brake head is removed the entire retaining device comprising the two wearing pieces C can be pushed through the trunnion and removed from either side thereof, and a new retaining device can be readily inserted, when the brake head is not in place, by simply pushing said device through the opening at either side of the trunnion.

This is a division of my application No. 790,488, filed September 18, 1913, issued Nov. 23, 1915 as Patent No. 1,161,329.

What I claim as my invention is:—

1. A brake beam comprising end portions provided with self adjusting brake heads, and means having screw-thread adjustment in said end portions for holding said heads in position by friction, operating by outward movement laterally of said end portions.

2. A brake beam comprising end portions provided with self adjusting brake heads, and means in said end portions for holding said heads in position by friction, operating by outward movement laterally of said end portions, said means including a pair of engaging members movable toward and away from each other, a spring interposed between said members, and means for compressing said spring.

3. A brake beam comprising end portions provided with self adjusting brake heads, and means in said end portions for holding said heads in position by friction, operating by outward movement laterally of said end portions, said means including a pair of engaging members movable toward and away from each other, each member having a stud on the inner side thereof, a spring on said studs, and a nut on one stud, having threaded engagement therewith, for adjusting the tension of said spring.

4. A brake beam comprising end portions provided with self adjusting brake heads, and means in said end portions for holding said heads in position by friction, operating by outward movement laterally of said end portions, said means including a pair of engaging members movable toward and away from each other, and means having screw-thread adjustment between said members to push them outward.

Signed by me at Chicago, Illinois, this 1st day of June, 1915.

ANDREW R. PEFFERS.